United States Patent [19]
Lin et al.

[11] Patent Number: 6,016,707
[45] Date of Patent: Jan. 25, 2000

[54] NON-INTRUSIVE PRESSURE VARIATION MONITORING DEVICE ADAPTED TO MONITOR ABDOMINAL PRESSURE IN PREGNANT WOMEN

[76] Inventors: Chih-Lung Lin; Han-Chang Wu, both of No. 1, Sec. 4, Roosevelt Rd., Taipei; Shuenn-Tsong Young, No. 155, Sec. 2, Li-Nung St., Shih-Pai, Taipei; Te-Son Kuo, No. 1, Sec.4, Roosevelt Rd., Taipei, all of Taiwan

[21] Appl. No.: 09/069,877

[22] Filed: Apr. 29, 1998

[51] Int. Cl.⁷ ....................................................... G01L 9/10
[52] U.S. Cl. ............................................................. 73/728
[58] Field of Search ........................... 73/722, 728, 753; 324/201, 207.11, 207.15, 207.16, 207.2, 207.21; 336/30; 331/65

[56] References Cited

U.S. PATENT DOCUMENTS

| | | | |
|---|---|---|---|
| 3,099,823 | 7/1963 | Bobula et al. | 73/728 |
| 4,011,758 | 3/1977 | Reenstra et al. | 73/728 |
| 4,195,531 | 4/1980 | Okamura | 73/728 |
| 4,208,918 | 6/1980 | Miyamae | 73/728 |
| 4,300,396 | 11/1981 | Buckshaw | 73/728 |
| 4,339,955 | 7/1982 | Iwasaki | 73/728 |
| 4,453,412 | 6/1984 | Nakane | 73/728 |
| 4,757,718 | 7/1988 | Fox | 73/722 |

*Primary Examiner*—William Oen
*Attorney, Agent, or Firm*—Pro-Techtor International Services

[57] ABSTRACT

A pressure variation monitoring device adapted to measure pressure variation of an object is disclosed. The monitoring device includes an abutting device adapted to detect the pressure variation of the object to be detected to generate a displacement in response to the pressure variation; a magnet supported on the abutting device to be movable therewith in response to the pressure variation; a coil co-axially surrounding the magnet and allowing the magnet to be movable relative thereto; an oscillation circuit, coupled to the coil to generate an oscillation signal; a signal processing unit for receiving and processing the oscillation signal to provide an output signal; and a display for providing a reading of the pressure variation.

10 Claims, 8 Drawing Sheets

NON-INTRUSIVE PRESSURE VARIATION MONITORING DEVICE ADAPTED TO MONITOR ABDOMINAL PRESSURE IN PREGNANT WOMEN

BACKGROUND OF THE INVENTION

1. Field of the Invention

The present invention relates generally to a pressure variation monitoring device for monitoring small pressure variation and in particular to a non-intrusive physical measuring device which is suitable for detection of abdominal pressure variation of a pregnant woman such as that caused by uterine contraction.

2. Description of the Prior Art

With the development of technology, most of the modern products, such as electronic devices, are getting smaller in size and less heavy in weight. For uterine contraction monitors, developments have been made to change the uterine contraction monitors from a complex, expensive and non-portable apparatus into a small, light-weighted and thus portable device which is particularly suitable for long-term ambulatory monitoring of the abdominal pressure variation or uterine contraction of a pregnant woman. Such conventional portable pressure variation detection/monitoring devices, although effective in detecting considerable pressure variation, yet is incapable to detect small or tiny pressure variation and may also be incapable to provided a stable and reliable operation.

FIG. 1 of the attached drawings schematically shows the principle of a conventional pressure variation monitoring device, which comprises a resistive detection element, such as a strain gauge 101, to detect the pressure variation. A pressure variation causes the strain gauge 101 to deform which in turn results in a change in the resistance of the strain gauge. Such a change in resistance leads in a corresponding change in voltage and thus may be detected, for example by means of a Wheatstone bridge as shown in FIG. 1 and converted by means of an analog-to-digital converter to provide digital readings of the pressure variation.

However, in detecting a small pressure variation, the error of the detection result of the strain gauge type pressure variation monitoring device is not acceptable for the measure is done on the basis of the change of the resistance caused by the deformation of the strain gauge. Since the resistance of the strain gauge may also vary with the change of environmental temperature, the precision of detection is significantly affected by the environmental temperature. Moreover, the location where the external pressure is applied to the strain gauge is also a factor that affects the deformation of the strain gauge and thus the detection result obtained therefrom.

To overcome such a drawback, a different pressure variation monitoring device has been proposed which is shown in FIG. 2 of the attached drawings. The device shown in FIG. 2 comprises a linear variable differential transformer (LVDT) circuit which has been widely used in detection of small pressure variation. In FIG. 2, the arrow represents the direction in which a displacement of a magnetic bar 21 is made by means of the pressure variation detected and such a displacement of the magnetic bar 21 induces output voltages Vce and Vde between output terminals c and e and output terminals d and e. The LVDT device shown in FIG. 2, although effective in providing a more stable and reliable reading of the pressure variation, yet it is not suitable to serve as a portable device for it is operated by alternate current which is usually supplied by an electrical main.

Thus it is desirable to provide a pressure variation monitoring device which overcomes the stable reading problem and is suitable for ambulatory monitoring purpose.

SUMMARY OF THE INVENTION

Therefor, an object of the present invention is to provide a pressure variation monitoring device particularly for long term and effectively monitoring the abdominal pressure of a pregnant woman caused by for example uterine contraction.

Another object of the present invention is to provide a non-intrusive pressure variation detection device which detects the pressure variation without intruding into the object to be detected.

A further object of the present invention is to provide a pressure variation monitoring device which has a low cost and provides a more stable and reliable detection signal.

To achieve the above objects, there is provided a pressure variation monitoring device adapted to detect pressure variation of an object to be detected, comprising an abutting device adapted to be placed on and in contact engagement with the object to be detected to generate a displacement in response to the pressure variation of the object; a magnet supported on the abutting device to be movable therewith in response to the pressure variation; a coil surrounding the magnet and allowing the magnet to be movable relative thereto so as to provide an inductance having a value variable in response to the displacement of the magnet relative thereto; an oscillation circuit, coupled to the coil to generate an oscillation signal having an oscillation frequency determined by the inductance value; a signal processing unit coupled to the oscillation circuit to receive and process the oscillation signal so as to provide a digital output signal representing the pressure variation; and a display connected to the signal processing unit to receive the output signal representing the pressure variation and thus provide a reading of the pressure variation.

In accordance with an aspect of the present invention, the signal processing unit comprises a microprocessor-based device having a central processing unit for processing the oscillation signal.

In accordance with another aspect of the present invention, the display may comprise a liquid crystal display or a light emitting diode display.

In accordance with a further aspect of the present invention, the abutting device comprises an object-contact plate biasingly supported by a spring. Preferably, the object-contact plate is made of an acrylic material.

Preferably, the magnet that is attached to the abutting device is arranged to be co-axially encompassed by the coil and movable relative thereto.

In accordance with a further aspect of the present invention, assuming the magnet has a length D and a magnetic permeability $\mu$, the coil has n turns and a cross-section area S, if a relative displacement of the magnet with respect to the coil is d, then an inductance $L=n^2 \cdot S \cdot [\mu_0 \cdot (D-d) + \mu \cdot d]$ may be detected at terminals of the coil, in which $\mu_0$ indicates the magnetic permeability of air.

The oscillation circuit and the coil form a known Colpitts oscillator.

To further understand the present invention, reference is made to the following detailed description of a preferred embodiment of the pressure variation monitoring device of the present invention, as well as the attached drawings, wherein:

DETAILED DESCRIPTION OF THE PREFERRED EMBODIMENT

Figure 1:
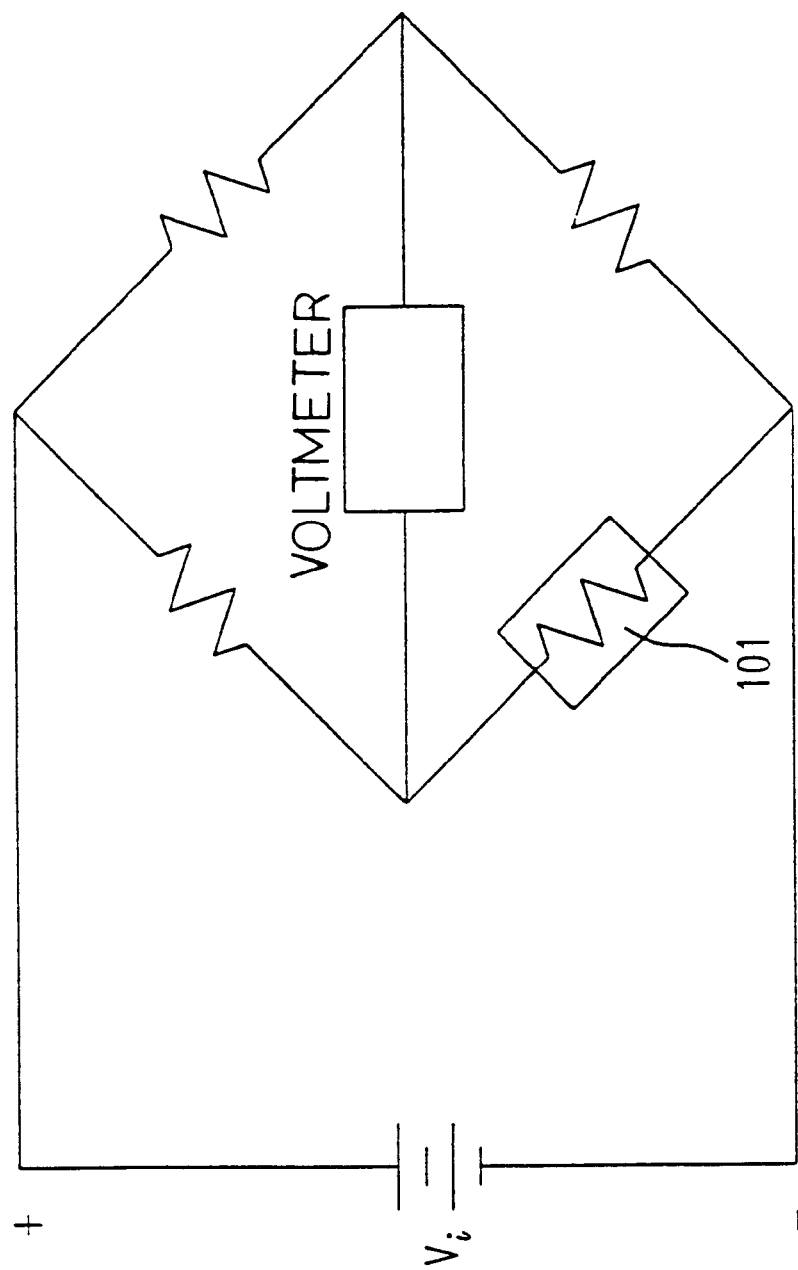
FIG. 1 is a schematic view of a conventional pressure variation monitoring device which adapts a strain gauge.
Figure 2:
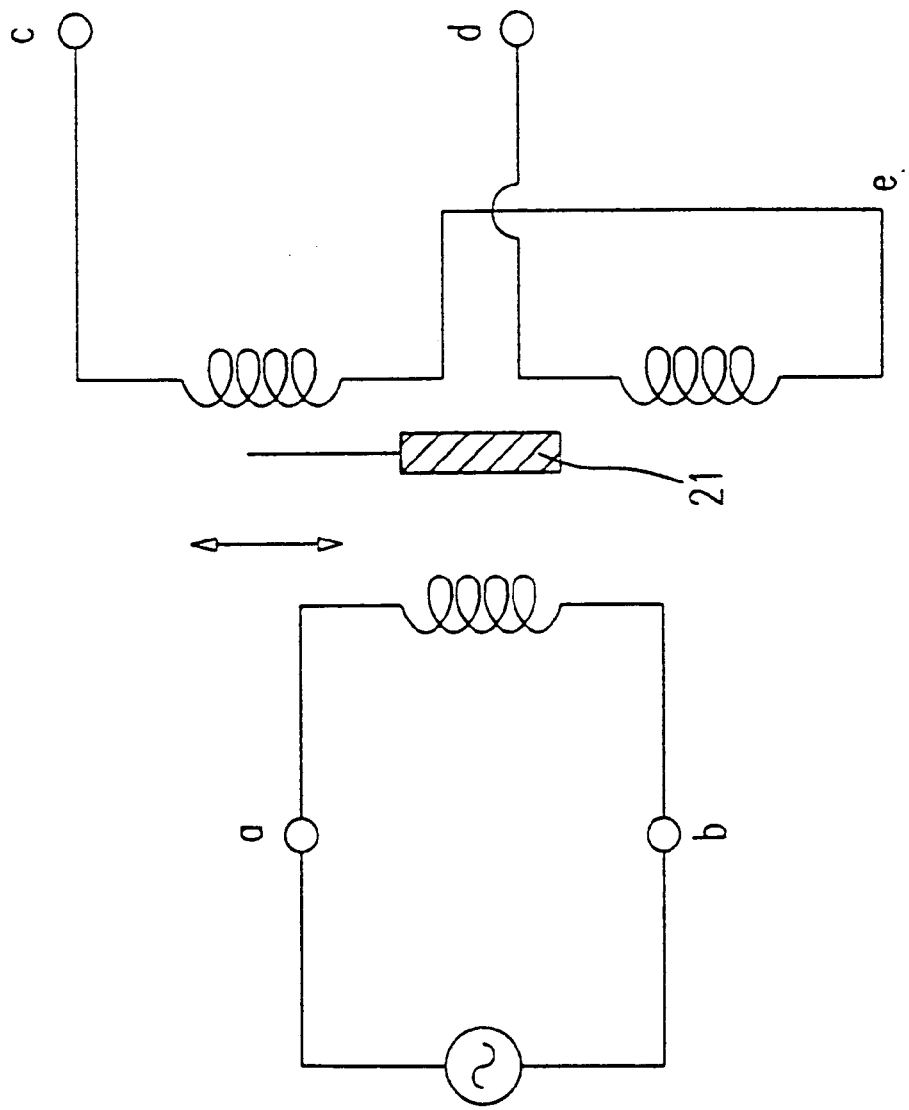
FIG. 2 is a schematic view of another conventional pressure variation monitoring device which adapts a linear variable differential transformer (LVDT)
Figure 3:
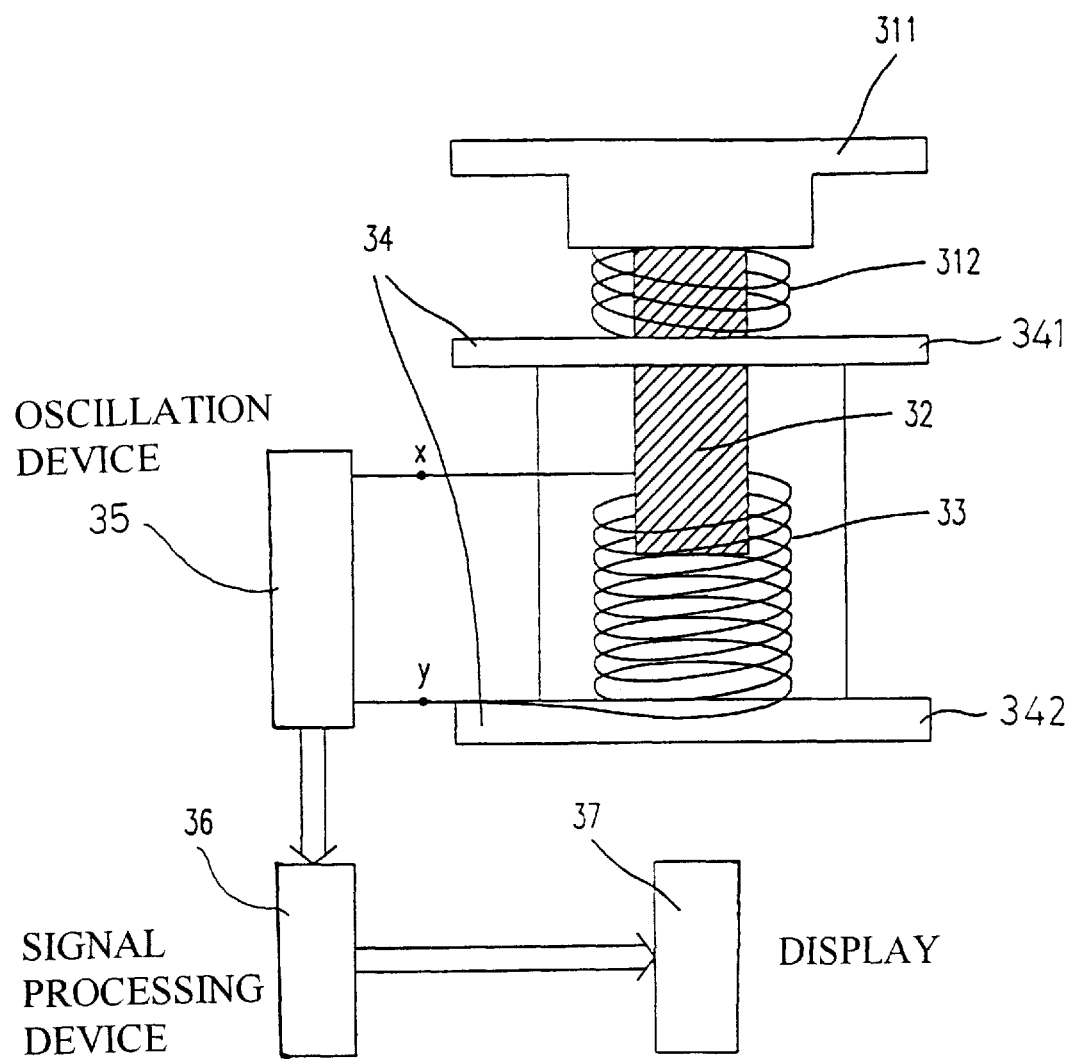
FIG. 3 is a schematic view showing a pressure variation monitoring device constructed in accordance with the present invention, with the electrical parts thereof shown in block form.

With reference to the drawings and in particular to FIG. 3, wherein a pressure variation monitoring device in accordance with the present invention is schematically shown with the circuit thereof being shown in block form, the pressure variation monitoring device of the present invention comprises an abutting device 31 comprising an object-contact plate 311, preferably made of an acrylic material, which is to be placed against and thus in physical contact with an object to be detected (not shown) so as to be movable by a pressure variation induced on the object to be detected and a spring 312 biasingly supporting the object-contact plate 311 thereon, a magnetic bar 32 which is attached to the object-contact plate 311 to be movable in unison therewith, a base 34 comprising a first plate 341 which supports the biasing spring 312 for movably supporting the object-contact plate 311 and a second plate 342 spaced from and fixed to the first plate 341 to hold a coil 33 therebetween. The first plate 341 is provided with an opening (not shown) to receive the magnetic bar 32 extending therethrough and into the coil 33 so as to allow a relative movement (displacement) of the magnetic bar 32 with respect to the coil 33 which causes a change in relative position between the magnetic bar 32 and the coil 33.

The pressure variation monitoring device of the present invention further comprises an oscillation device 35, a signal processing device 36 and a display 37 which will be further discussed.

The operation of the pressure variation monitoring device of the present invention will be described. The object-contact plate 311 is placed on the object to be detected, such as placed on the abdomen of a pregnant woman in a position corresponding to the uterine (not shown), and fixed thereon by means of for example a waist belt (not shown). The pressure variation occurring inside the uterine, such as that caused by uterine contraction, is transmitted to the object-contact plate 311, causing a relative displacement of the object-contact plate 311 with respect to the first plate 341 of the base 34 by deforming (compressing in the embodiment illustrated) the spring 312, which follows Hooke's law. In response to the deformation (compression) of the spring 312, the magnetic bar 32 changes the relative position thereof with respect to the coil 33 which is fixed between the first and second plates 341 and 342 of the base and thus causes a change in the inductance of the coil 33 detected between terminals x and y of the coil 33.

Figure 4:
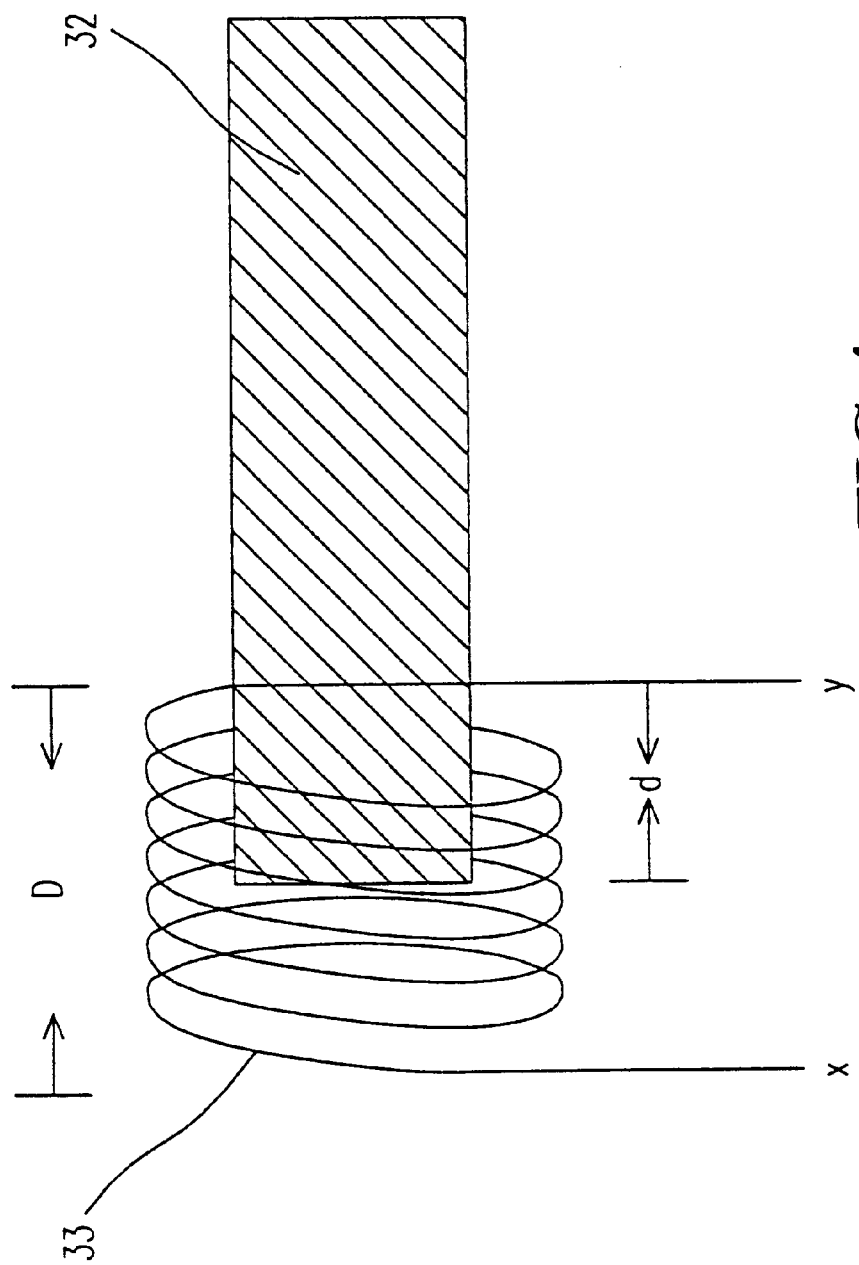
FIG. 4 is a schematic view showing the relative displacement between the magnet and the coil adapted in the pressure variation monitoring device of the present invention.

FIG. 4 schematically shows the positional relationship between the magnetic bar 32 and the coil 33. In FIG. 4, reference symbol "D" denotes the length of the coil 33 and reference symbol "d" the relative displacement between the magnetic bar 32 and the coil 33 when the pressure variation inside the uterine is transmitted to the magnetic bar 32 via the object-contact plate 311 and the spring 312. The inductance L between the terminals x and y of the coil 33 is formulated as follows:

$$L = L_1 + L_2 = n^2 \cdot \mu_0 \cdot S \cdot (D-d) + n^2 \cdot \mu \cdot S \cdot d$$
$$= n^2 \cdot S \cdot [\mu_0 \cdot (D-d) + \mu \cdot d] \quad (1)$$

wherein D is the length of the coil 33, d is the displacement of the magnetic bar 32, $\mu$ is magnetic permeability of the magnetic bar 32, $\mu_0$ is magnetic permeability of air, n is the number of turns of the coil 33, S is the cross-sectional area of the coil 33. Since $\mu$ is considerably greater than $\mu_0$, the relationship between the inductance L and displacement d may be simplified as $L = n^2 \cdot S \cdot \mu \cdot d$ which indicates a proportional relationship exists between the inductance L and the displacement d.

Figure 5:
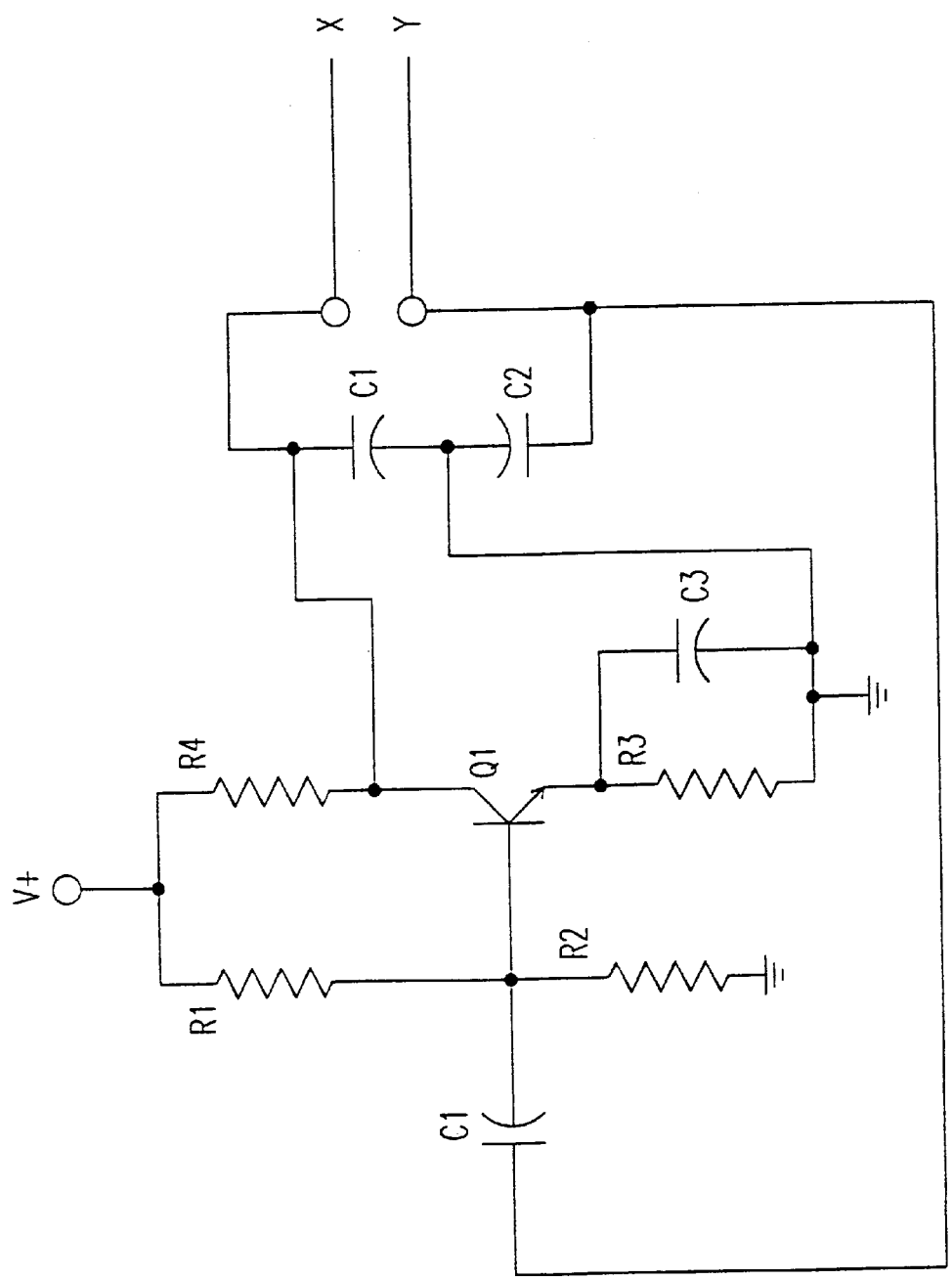
FIG. 5 is a circuit diagram of an LC oscillation circuit which generates an oscillation signal having a frequency determined by the inductance detected at the terminals of the coil.

The coil 33, together with a capacitor which partly constitutes the oscillation device 35, forms an LC oscillation circuit as shown in FIG. 5 which is the embodiment illustrated is a Colpitts oscillator, providing an oscillation frequency $\omega_0$ as follows:

$$\omega_0 = \frac{1}{\sqrt{L\left[\frac{C_1 C_2}{C_1 + C_2}\right]}} \quad (2)$$

Figure 6:
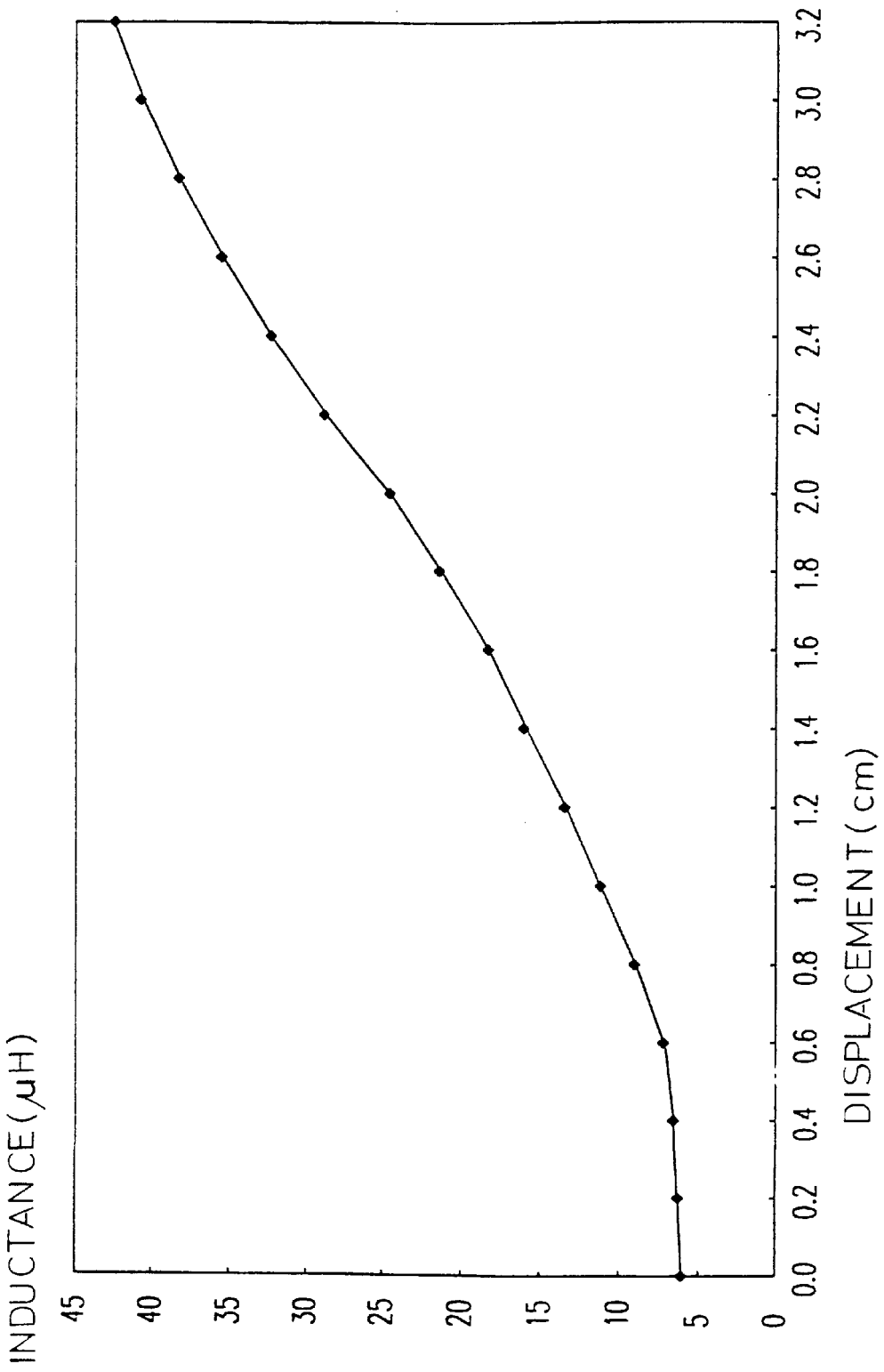
FIG. 6 is a plot showing the relationship between the displacement of the magnet and the inductance detected at the terminals of the coil.

With reference to FIG. 6, which plots a curve representing the relationship between the displacement d and the inductance which is obtained from equation (1) and the displacement d results from the pressure variation of the object to be detected by means of Hooke's law. By means of further manipulation with equation (2), a curve representing the relationship between the pressure variation of the object to be detected and the oscillation frequency $\omega_0$ may be derived and illustrated in FIG. 7.

Figure 7:
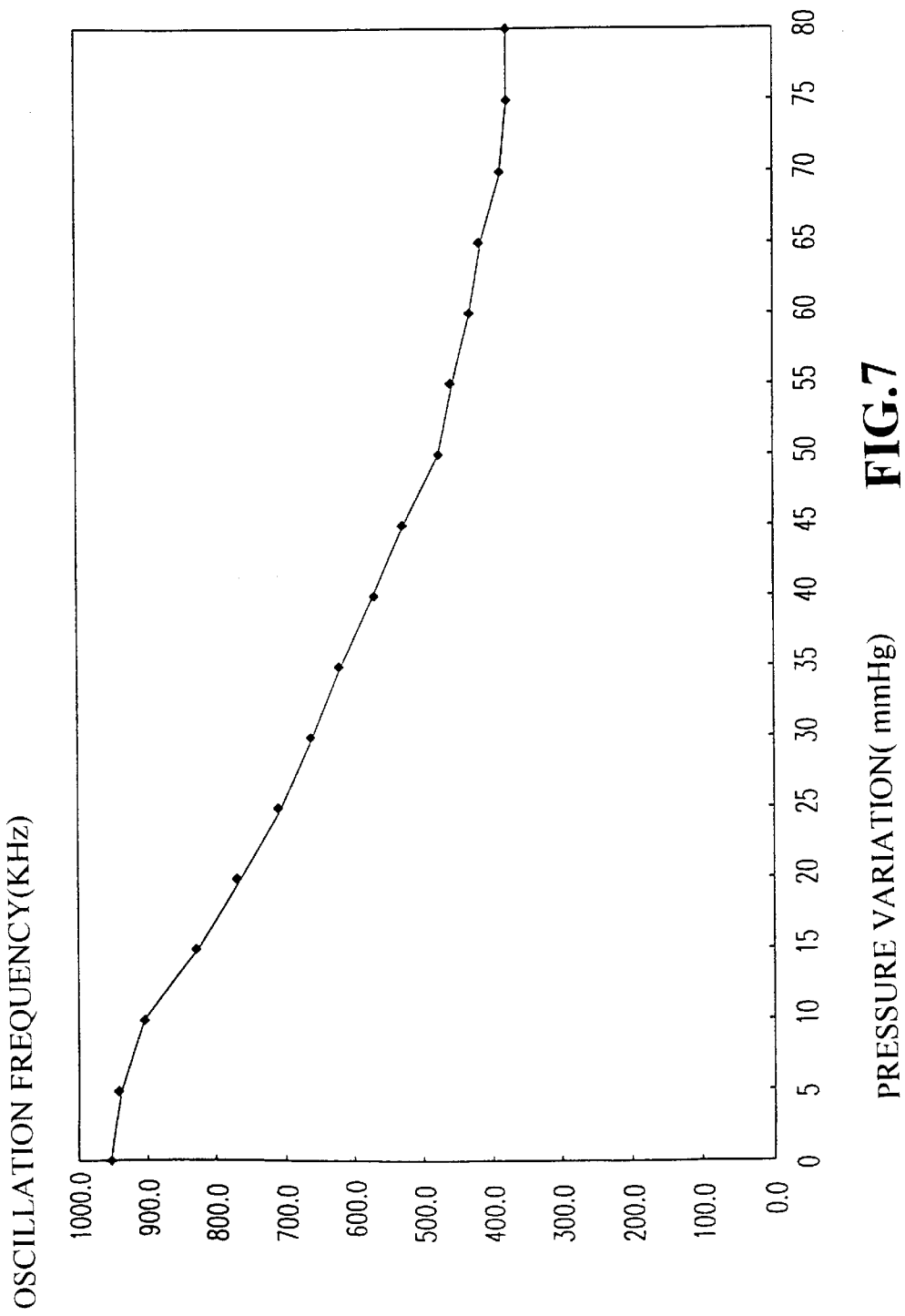
FIG. 7 is a plot showing the relationship between the pressure variation of the object to be detected and the oscillation frequency of the oscillation signal generated by the LC oscillation circuit.
Figure 8:
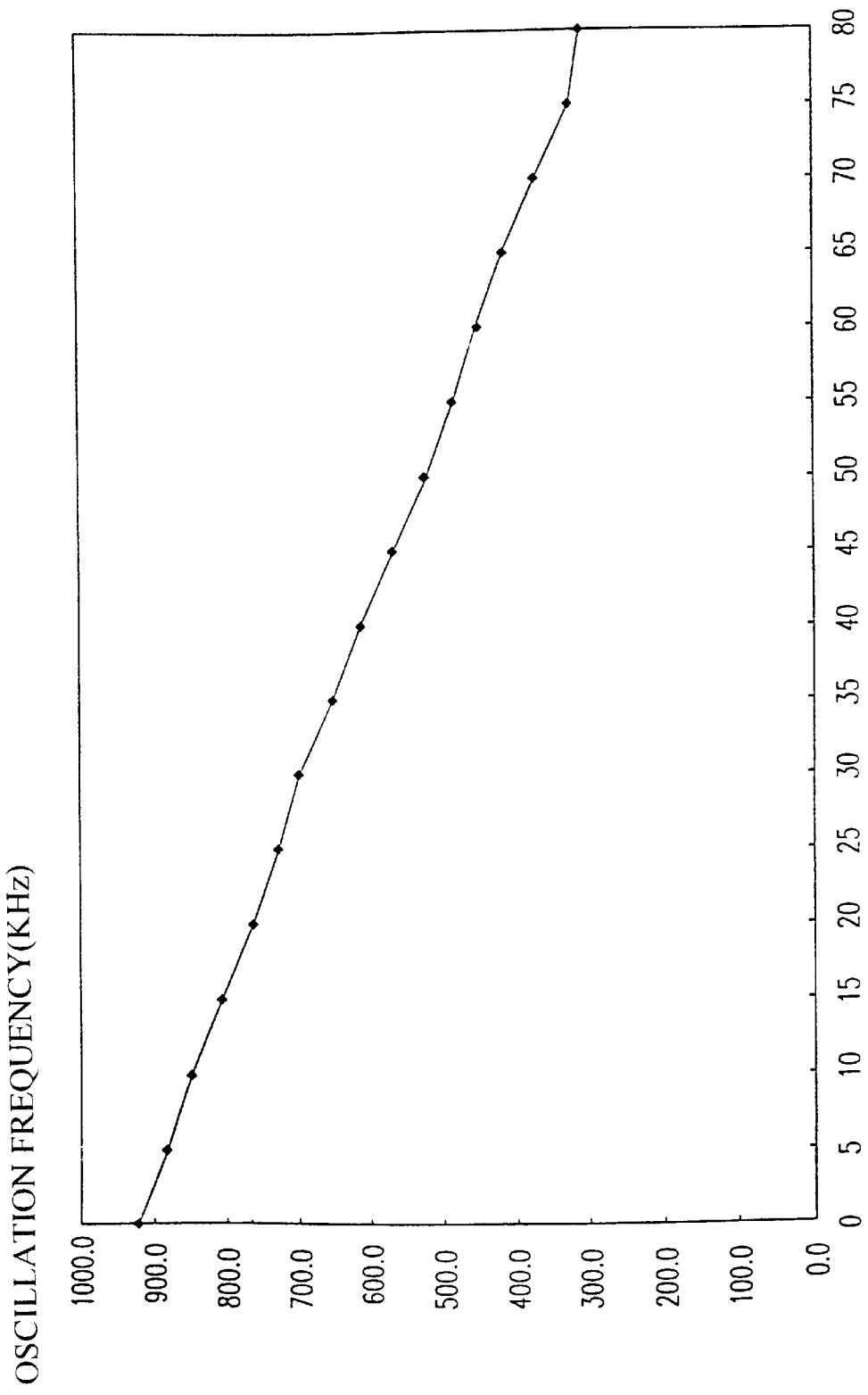
FIG. 8 is a plot showing a modified curve representing the relationship between the pressure variation and the oscillation frequency which is provided by processing the curve of FIG. 7 with a microprocessor-based signal processing device.

It is evident from equations (1) and (2) and the curves shown in FIGS. 6 and 7 that the relationship between the pressure variation and the oscillation frequency is not exactly linear. Thus, it is preferable to derive an inverse function from equations (1) and (2) to modify the non-linear result. Such a modification may be done in accordance with a built-in table with the signal processing device 36 which is preferably a microprocessor based device comprising a central processing unit for processing/manipulation purpose. The modified result is shown in FIG. 8. The processed signal, preferably in digital form, that represents the curve of FIG. 8 is then shown on the display 37 which comprises for example a liquid crystal display or a light emitting diode display. Thus a user may readily obtain readings regarding the pressure variation from the display 37.

To this point, it is apparent that the present invention provides a portable pressure variation monitoring device which overcomes the problems of being hard to obtain stable/reliable operation of the conventional resistive type pressure variation monitoring device and being bulky of the LVDT type pressure variation monitoring device. The device of the present invention is particularly suitable for long-term ambulatory monitoring of the abdominal pressure variation of a pregnant woman caused by for example uterine contraction.

Although the preferred embodiment of the present invention has been described to illustrate the present invention, it is apparent that changes and modifications in the specifically described embodiment can be carried out without departing from the scope of the invention which is intended to be limited only by the appended claims.

What is claimed is:

1. A pressure variation monitoring device comprising:

abutting means adapted to be placed on and in physical contact engagement with an object having a pressure variation occurring therein to be detected by the pressure variation monitoring device, the abutting means generating a displacement in response to the pressure variation of the object;

magnet means which is supported on the abutting means to be movable therewith in response to the pressure variation;

coil means surrounding the magnet means and allowing the magnet means to be movable relative thereto so as to provide a variable inductance in response to the displacement of the magnet means relative thereto;

an oscillation circuit electrically coupled to the coil means to generate an oscillation signal having an oscillation frequency determined by the inductance;

a signal processing unit which is coupled to the oscillation circuit to receive and process the oscillation signal from the oscillation circuit so as to provide a digital output signal representing the pressure variation, the signal processing unit manipulates a non-linear relationship between the variable inductance and the oscillation frequency so as to derive an output signal representing the pressure variation linearly related to the oscillation frequency; and display means connected to the signal processing unit to receive the output signal of the signal processing unit and display the signal representing the pressure variation.

2. The pressure variation monitoring device as claimed in claim 1, wherein the signal processing unit comprises a microprocessor-based device for receiving and processing the oscillation signal.

3. The pressure variation monitoring device as claimed in claim 1, wherein the display means comprises a liquid crystal display.

4. The pressure variation monitoring device as claimed in claim 1, wherein the display means comprises a light emitting diode display.

5. The pressure variation monitoring device as claimed in claim 1, wherein the abutting means comprises an object-contact plate biasingly supported by a spring.

6. The pressure variation monitoring device as claimed in claim 5, wherein the object-contact plate is made of an acrylic material.

7. The pressure variation monitoring device as claimed in claim 1, wherein the magnet means comprises a magnetic bar.

8. The pressure variation monitoring device as claimed in claim 7, wherein the magnetic bar is arranged substantially co-axially within the coil means.

9. The pressure variation monitoring device as claimed in claim 1, wherein the magnet means comprises a magnetic bar having a length D and a magnetic permeability $\mu$ and the coil means comprises a coil having n turns and a cross-section area S, the magnetic bar having relative displacement d with respect to the coil and wherein the variable inductance is formulated as $L=n^2 \cdot S \cdot [\mu_0 \cdot (D-d)+\mu \cdot d]$, in which $\mu_0$ indicates the magnetic permeability of air.

10. The pressure variation monitoring device as claimed in claim 1, wherein the oscillation circuit and the coil means form a Colpitts oscillator.

\* \* \* \* \*